(12) United States Patent
Wisdom, Sr.

(10) Patent No.: US 11,647,704 B2
(45) Date of Patent: May 16, 2023

(54) PORTABLE LOG SKIDDER

(71) Applicant: Scott L Wisdom, Sr., Rolla, MO (US)

(72) Inventor: Scott L Wisdom, Sr., Rolla, MO (US)

( * ) Notice: Subject to any disclaimer, the term of this patent is extended or adjusted under 35 U.S.C. 154(b) by 477 days.

(21) Appl. No.: 16/823,268

(22) Filed: Mar. 18, 2020

(65) Prior Publication Data

US 2020/0305362 A1 Oct. 1, 2020

Related U.S. Application Data

(60) Provisional application No. 62/823,933, filed on Mar. 26, 2019.

(51) Int. Cl.
A01G 23/00 (2006.01)
B60P 3/41 (2006.01)

(52) U.S. Cl.
CPC .............. A01G 23/006 (2013.01); B60P 3/41 (2013.01)

(58) Field of Classification Search
CPC ................................ A01G 23/006; B60P 3/41
USPC ......................................................... 414/704
See application file for complete search history.

(56) References Cited

U.S. PATENT DOCUMENTS

| | | | | |
|---|---|---|---|---|
| 531,503 | A | * | 12/1894 | Brough, Jr. ............... B60P 3/41 414/435 |
| 536,745 | A | * | 4/1895 | Tisdale ................... B66C 19/02 414/435 |
| 794,576 | A | * | 7/1905 | Williams ................ B66C 19/02 212/343 |
| 2,399,304 | A | * | 4/1946 | Watkins .................... B60P 3/41 414/460 |
| 2,452,338 | A | | 10/1948 | Thompson |
| 3,477,596 | A | | 11/1969 | Michaelson et al. |
| 3,576,266 | A | | 4/1971 | Widley et al. |
| 3,630,243 | A | | 12/1971 | Hamilton et al. |
| 3,688,932 | A | | 9/1972 | Carter |
| 4,278,392 | A | | 7/1981 | Melsel, Jr. |
| 4,436,475 | A | | 3/1984 | Blagg |
| 5,010,933 | A | | 4/1991 | Doyle |
| 5,052,880 | A | * | 10/1991 | Ross ...................... B60P 3/127 280/402 |
| 5,141,386 | A | | 8/1992 | Barwise |
| 5,620,298 | A | | 4/1997 | Barwise |
| 5,876,174 | A | | 3/1999 | Arsenault |
| 6,231,030 | B1 | | 5/2001 | Smith |
| 6,932,555 | B2 | | 8/2005 | Dale et al. |

(Continued)

FOREIGN PATENT DOCUMENTS

| | | | | |
|---|---|---|---|---|
| DE | 202004010988 | U1 | * 10/2004 | ......... A01G 23/003 |
| FR | 938372 | A | * 9/1948 | |
| FR | 1206686 | A | * 2/1960 | |

*Primary Examiner* — Hilary L Gutman
(74) *Attorney, Agent, or Firm* — Rebecca L. Rich (57) ABSTRACT

A device for picking up and hauling a log or similar object and a method for its use are disclosed. The device is capable of picking up one end of the log and dragging the log behind it, but is also capable of picking up the entire log off the ground. The device can be anchored to and pulled behind a small vehicle, such as an all-terrain vehicle (ATV) or utility vehicle (UTV), or behind a large vehicle such as a car or truck. The device uses no winches or hydraulics that could break or wear out, and lifts and holds the log solely using levers and chains as attachment points. The device is able to maneuver over rugged terrain and is also able to be towed at high speeds on a road.

20 Claims, 9 Drawing Sheets

(56) References Cited

U.S. PATENT DOCUMENTS

| | | |
|---|---|---|
| 7,472,916 B2 | 1/2009 | Varcoe |
| 7,547,180 B2 | 6/2009 | Nye |
| 7,568,876 B1 | 8/2009 | Tenney |
| 7,611,320 B2 | 11/2009 | Bell |
| 8,444,361 B1 | 5/2013 | Hershey |

* cited by examiner

PORTABLE LOG SKIDDER

PRIORITY CLAIM

The present patent application claims priority benefit to US Provisional Patent Application Ser. No. 62/823,933, filed Mar. 26, 2019, entitled "Portable Log Skidder," and incorporated by reference in its entirety herein.

BACKGROUND OF INVENTION

Field of the Invention

This invention relates to a device and method for lifting and hauling an elongated load, such as a log, behind a vehicle.

PRIOR ART

Lifting and hauling a log from its original location to another location can present a number of challenges. The log itself may be many feet long, and weigh hundreds of pounds. Additionally, often the log's original location is among other trees or objects that may be difficult to navigate through or around. Consequently, a number of devices have been invented that are able to transport the log from its original location to another location. These devices range from very simple, such as tying a chain around one end of the log and dragging it behind a person, animal, or machine, to very complex, such as crane systems utilized in commercial logging applications. These devices and methods each present benefits and drawbacks. Simple devices, such as a sled or skid, are easy to make and use in theory, but do not offer much mechanical advantage and it may be very difficult to use in practice. Additionally, simple devices that only drag the log along the ground run the risk of snagging on rocks or getting stuck, as well as damaging the ground over which they are dragged. More complex devices may offer more mechanical advantage, but are often larger with more moving parts, which are prone to break or wear out. Additionally, more complex and larger devices may be difficult to maneuver around trees or other objects, or even impossible to move without disassembling and reassembling in another location. These immobile devices also are not able to transport the log very far from its original location, and require that the log be loaded onto a trailer, truck, train, boat, or other means of transport. There is a need for a device that is able to lift and haul a log, and is able to be towed behind a vehicle, but is compact and simple in its working mechanism and rugged, so as to avoid costly maintenance and repairs.

SUMMARY OF THE INVENTION

A device for picking up and hauling a log or similar object and a method for its use are disclosed. The device is capable of picking up one end of the log and dragging the log behind it, but is also capable of picking up the entire log off the ground. The device can be pulled behind a small vehicle, such as an all-terrain vehicle (ATV) or utility vehicle (UTV), or behind a large vehicle such as a car or truck. The device uses no winches or hydraulics that could break or wear out, and lifts and holds the log solely using levers and rope, cable, or chain as attachment points. The device is able to maneuver over rugged terrain and is also capable of being pulled at high speeds on a road.

DETAILED DESCRIPTION OF THE INVENTION

Figures

INVENTIVE DEVICE

Figure 1A:
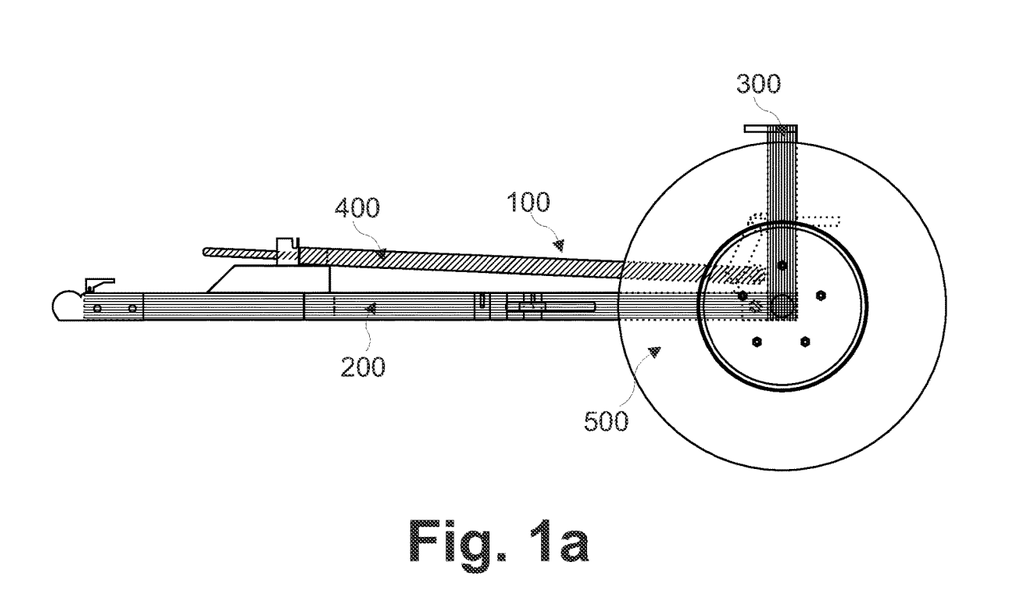
FIG. 1a is a side view of the log hauler in a down position.
Figure 1B:
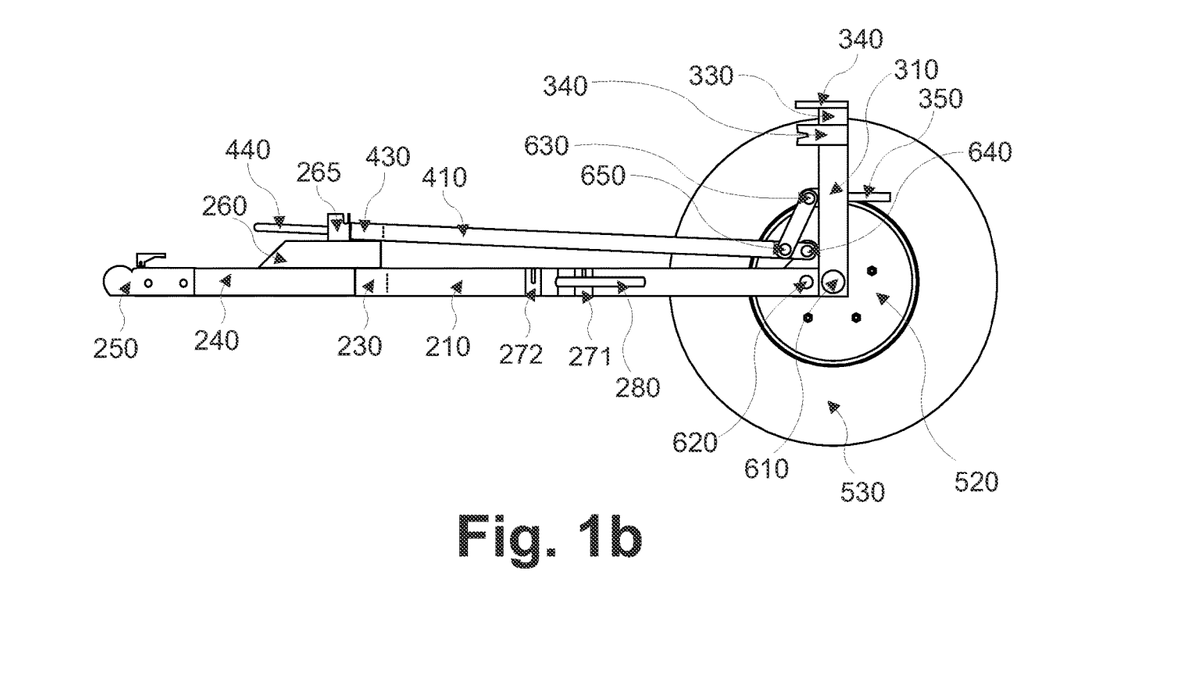
FIG. 1b is a side view of the log hauler in a down position with the front wheel assembly not shown.
Figure 2:
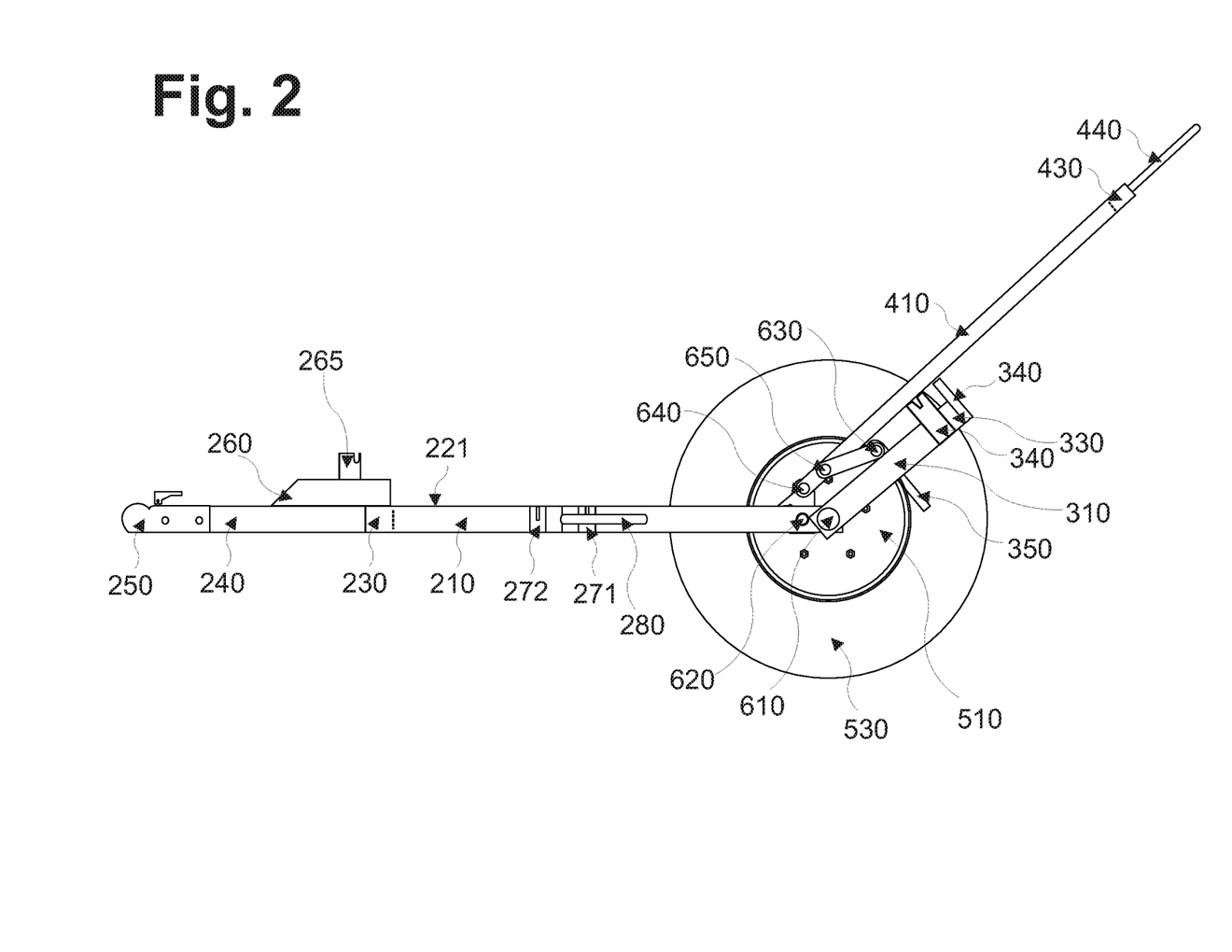
FIG. 2 is a side view of the log hauler in an up position.

In more detail, FIG. 1a shows a side view of the log hauler 100 in a down position, with lower body 200 (indicated by horizontal hatching), upright support 300 (indicated by vertical hatching), arm 400 (indicated by diagonal hatching), and wheel assembly 500, and FIG. 1b shows a side view of the log hauler 100 in a down position with the front wheel assembly not shown. FIG. 2 shows a side view of log hauler 100 in an up position.

As shown in more detail in FIG. 1a, lower body 200 is joined to upright support 300 in a movable position. Preferably, lower body 200 and upright support 300 are joined at about a 90-degree angle when arm 400 is in the "down" position, that is, the plane of arm 400 is substantially parallel to the plane of lower body 200. As used herein, "substantially parallel" is defined as two line segments which are parallel, or if they did intersect, would preferably form an angle of less than 10 degrees, more preferably less than 5 degrees. Arm 400 is joined to lower body 200, upright support 300, or a combination of lower body 200 and upright support 300 in a movable position. Preferably, arm 400 is joined to both lower body 200 and upright support 300 by a primary movable attachment point 600, depicted in more detail in FIG. 11. Lower body 200 is attached to wheel assembly 500 at or near the junction of lower body 200 and upright support 300. Optionally, upright support 300 may be attached to wheel assembly 500 at or near the junction of the lower body 200 and upright support 300.

In one preferred embodiment depicted in FIGS. 1-4, lower body 200 comprises two substantially parallel legs 210 and 220 connected to a crossbar 230. In another embodiment, leg 210 and leg 220 are connected by a U-shape such that crossbar 230 would be represented by the apex of the curve in the U-shape connecting the two legs, and leg 210, leg 220, and crossbar 230 would be all of one continuous piece. Legs 210 and 220 and crossbar 230 are all joined in a fixed position. For the purposes of this description, the plane of lower body 200 is the plane that passes through both the entirety of leg 210, leg 220, and crossbar 230. During normal use, the plane of lower body 200 is relatively (but not substantially) parallel to the ground.

Tongue 240 is joined to crossbar 230 in a fixed position parallel to legs 210 and 220 and perpendicular to crossbar 230 such that legs 210 and 220, crossbar 230, and tongue 240 are all in the plane of the lower body. Trailer hitch 250 is attached to the end of tongue 240 opposite crossbar 230. Trailer hitch 250 may be any commercially available trailer hitch and may be of any size suitable for attaching log hauler 100 to an appropriate vehicle. It will be appreciated that trailer hitch 250 may be removable in order to change trailer hitches to use one of an appropriate size. Trailer hitch 250 is preferably attached to tongue 240 using bolts, pins, or similar means. Optional spacer 260 is attached in a fixed position to the top surface of tongue 240 and/or the top surface of crossbar 230. Optional locking mechanism 265 is attached to the top surface of optional spacer 260, crossbar 230, and/or tongue 240. Leg 210 may have one or more optional attachment point(s) 271 and 272, which are mirrored on leg 220. Legs 210 and 220 may also have optional wheel guards 280. In some embodiments, lower body 200 has one or more movable attachment point 620 on each of legs 210 and 220 to attach to arm 400. Each of legs 210 and 220 are attached in a movable position to a wheel assembly 500.

In one embodiment, upright support 300 comprises two substantially parallel legs 310 and 320 connected by crossbar 330. In an especially preferred embodiment, legs 310 and 320 are connected in a U-shape such that crossbar 330 is represented by the apex of the curve in the U-shape connecting legs 310 and 320. In this embodiment, shown in more detail in FIG. 4, upright support 300 is essentially 180° of a circle, with crossbar 330 being at 90° of the half circle, and leg 310 and 320 forming the remainder of each end of the half circle. At the end of each of legs 310 and 320, a straight portion adjoins the half circle in order to more easily attach axle 510 and/or moveable attachment point 610. In any embodiment, legs 310 and 320 and crossbar 330 are all joined in a fixed position. Upright support is joined in a movable position with lower body 200 at attachment point 610 on each of legs 310 and 320. Upright support 300 has one or more attachment points 340 joined in a fixed position to crossbar 330 and/or legs 310 and 320. In some embodiments, upright support 300 has one or more movable attachment point 630 on each of legs 310 and 320 with arm 400. Upright support 300 may also have one or more optional handles 350 attached to legs 310 and 320 and/or crossbar 330. For the purposes of this description, the plane of upright support 300 is the plane that passes through both the entirety of leg 310, leg 320, and crossbar 330. In one embodiment, each of legs 310 and 320 are attached in a movable position to a wheel assembly 500. Advantageously, legs 310 and 320 are positioned to minimize the distance between legs 310 and 320 and wheel assembly 500 or even have legs 310 and 320 extend past the inside edge of tire 510, so as to maximize the distance between the inside edge of legs 310 and 320 while minimizing the width of log hauler 100.

In one preferred embodiment, arm 400 comprises two substantially parallel legs 410 and 420 connected by crossbar 430. In another embodiment, legs 410 and 420 are joined in a U-shape such that crossbar 430 is represented by the apex of the curve in the U-shape connecting legs 410 and 420. Legs 410 and 420 and crossbar 430 are all joined in a fixed position. Arm 400 has one or more optional handle 440 attached in a fixed position to crossbar 430 and/or legs 410 and 420. The handle or handles can be of any shape or shapes, so long as there is sufficient clearance in order for the user to grip the handle or handles to raise and lower arm 400. For the purposes of this description, the plane of arm 400 is the plane that passes through both the entirety of leg 410, leg 420, and crossbar 430. Arm 400 has either one or both of an attachment point 640 on each of legs 410 and 420 with lower body 200 and/or an attachment point 650 on each of legs 410 and 420 with upright support 300.

Two identical wheel assemblies 500 are attached in a fixed position to lower body 200 on each of legs 210 and 220. Each wheel assembly 500 is joined to legs 210 and 220 at the end opposite crossbar 230 and nearest the point where lower body 200 joins upright support 300. Wheel assembly 500 comprises an axle 510, wheel 520, and tire 530. Those skilled in the art will understand that wheel assembly 500 may include other parts such as bearings, bolts, etc., to enable the wheel assembly to connect its respective parts and connect it to lower body 200 while retaining the ability for wheel 520 and tire 530 to rotate freely around axle 510. In one preferred embodiment, axle 510 and the movable connection 610 that joins lower body 200 and upright support 300 are of one piece. The tires 530 are preferably a heavy duty tire from about 12" in diameter to about 17" in diameter, more preferably about 15" in diameter, and preferably from about 8 ply to about 12 ply, more preferably about 10 ply. Advantageously, the wheels 520 and tires 530 are larger than many prior art log skidders or log haulers, which allows them to navigate rough terrain better, as well as be towed at higher speeds. Axle 510 is preferably rated for at least about 2000 pounds, more preferably at least about 3000 pounds, and even more preferably at least about 3500 pounds. Advantageously, the large, heavy-duty tires allow the log hauler to navigate on and off road, and can navigate timberland and natural terrain such as rocks, stumps, small trees, mud, snow, brush, tall grass, and combinations thereof. When on road, the log hauler can be towed at speeds of up to 70 miles per hour.

As used herein, joined in a "fixed position" means that two or more parts are joined in a manner that will not allow them to move relative to each other in any direction. This may be achieved by a number of means, such as welding, the use of permanent adhesives, the use of bolts, nails, rivets, or any other method that could be used to fix the two parts relative to one another. As used herein, joined in a "movable position" is defined as being joined in a permanent fashion such that at the juncture of two or more parts, the parts can move in one or more plane of motion relative to one another. Fixing in a "movable position" may be achieved through attaching via hinges, bolts, bearings, or other linkages that would allow the two or more parts to move in one or more direction relative to one another.

Figure 12:
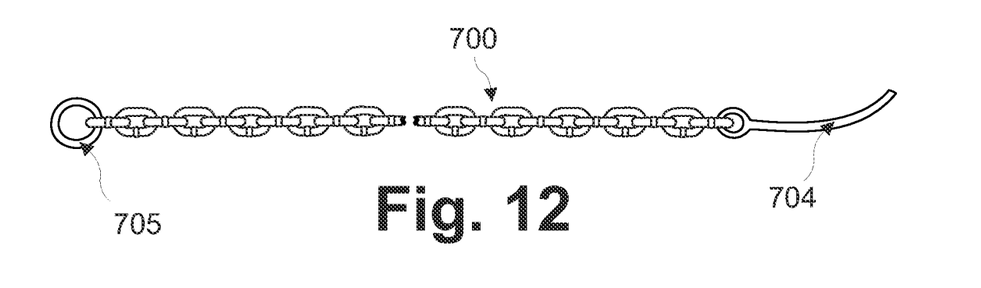
FIG. 12 is a preferred chain configuration for the first flexible linkage.

Preferably the movable attachment point 600 is a four-bar linkage. FIG. 12 shows the four-bar linkage in detail, where the joints of the four-bar linkage comprises (I) a joint formed by the movable connection 610 between leg 210 of lower body and leg 310 of the upright support 300, (ii) the joint formed by the movable connection 640 between leg 210 of lower body 200 and leg 410 of arm 400, (iii) a joint formed by the movable connection 650 between leg 410 of arm 400 and link 670, and (iv) a joint formed by the movable connection 630 between link 670 and leg 310 of upright support 300. In the embodiment shown in FIG. 12, spacer 660 is provided to create the desired distance between movable connection 640 and leg 210, and spacer 660 is attached in a fixed position to leg 210 by fixed attachment point 620. Spacer 680 is provided to create the desired distance between movable connection 630 and leg 310, and spacer 680 is attached in a fixed position to leg 310. It will be appreciated that leg 220, leg 320, and leg 420 are movably attached in the same manner. Each of movable attachment points 610, 630, 640, and 650 are preferably greased pinned hinges.

As opposed to prior art log haulers or log skidders, which are engineered to distribute the weight of the load such that the weight is centered on a central balance point over the wheel or wheels of the log hauler, the inventive device is designed to exert an upward force on the trailer hitch 250. In doing so, the force is distributed to the towing vehicle such that there is more downward force on the front end of the towing vehicle, which is typically front-wheel drive. This transfer of force allows a smaller vehicle to tow a larger load.

In one especially preferred embodiment, the log hauler is designed to be towed by a small all-terrain vehicle (ATV). In this embodiment, the ATV used to tow the log hauler is approximately 4 feet wide, and approximately 600-700 pounds. When this size towing vehicle is used, the length of log hauler 100 is from about 6 feet long to about 8 feet long, more preferably about 7 feet long. The weight of log hauler 100 is from about 250 pounds to about 300 pounds, more preferably about 275 pounds. In this embodiment, lower body 200, including legs 210 and 220 and crossbar 230, is manufactured of 2 inch by 2 inch square steel tubing with a ¼ inch wall thickness. The distance between legs 210 and 220 is from about 25 inches to about 27 inches, preferably about 26 inches, and the length of legs 210 and 220 are from about 40 inches to about 48 inches, preferably about 45 inches.

In this embodiment, upright support 300, including legs 310 and 320 and crossbar 330, is manufactured of 2.5 inch by 2.5 inch steel tubing with a 3/16 inch wall thickness and is preferably a half circle with an outside radius of about 17 inches. In this embodiment, arm 400, including legs 410 and 420 and crossbar 430, is manufactured of 1.5 inch by 1.5 inch square steel tubing with a 3/16 inch wall thickness. The distance between leg 410 and leg 420 is from about 26 inches to about 28 inches, preferably about 27 inches, and the length of legs 410 and 420 are from about 40 inches to about 48 inches, preferably about 45 inches. The width of the log hauler, between the outer edges of tires 530, is preferably from about 40 inches to about 56 inches, more preferably about 48 inches. In this embodiment, the length between movable attachment point 650 and movable attachment point 640 is from about 1 inch to about 3 inches, more preferably about 1.75 inches, and the length between movable attachment point 630 and fixed attachment point 620 is about 9 inches. In this embodiment, link 670 has a thickness of about 1 inch and the pins that form movable attachment points 610, 630, 640, and 650 are preferably about ¾ inch in diameter. In this embodiment, the log hauler 100 is preferably covered in enamel paint for both decorative and protective purposes, but powder coating or other coatings and coating methods could be used for similar purposes.

As described herein, the log hauler 100 is described in dimensions and functionality to be hauled behind a standard ATV or 4-wheeler normally weighing between 600 and 700 pounds. It will be appreciated that when a larger and/or heavier side-by-side utility vehicle or car, truck, or tractor is used, the dimensions of the log hauler 100 may be increased, thereby increasing the size, weight, and amount of load that can be handled. The specifications described in this application are in no way intended to limit the invention to only the embodiment described in this application.

Method of Use

Although all embodiments of this invention are described as being intended for hauling a log, it should be appreciated that the claimed device and method could be used for hauling any rigid, elongated object that is of a size and shape similar to a log, such a fence post, i-beam, or other object. Additionally, it should be appreciated that the claimed device and method could be used to haul more than one log or similarly-shaped object, provided the object or objects can be handled in a group in the same manner as a single log or similarly-shaped object. Preferably, when the log hauler 100 is being towed by a standard ATV, the object to be hauled is less than about 24 inches in diameter, more preferably from about 6 inches in diameter to about 24 inches in diameter, even more preferably from about 12 inches in diameter to about 24 inches in diameter. When the object to be hauled is of the maximum diameter of 24 inches, it is preferably less than 9 feet long, more preferably from about 3 feet long to about 8 feet long. The object to be hauled is preferably from about 500 pounds to about 1500 pounds, more preferably from about 100 pounds to about 2000 pounds. Again, it will be appreciated that these diameter, length, and weight limitations are in view of the dimensions described for a log hauler 100 to be pulled behind a standard ATV, but the dimensions of the log hauler 100 could be increased to accommodate a larger load if it was intended to be towed behind a larger vehicle.

Figure 3:
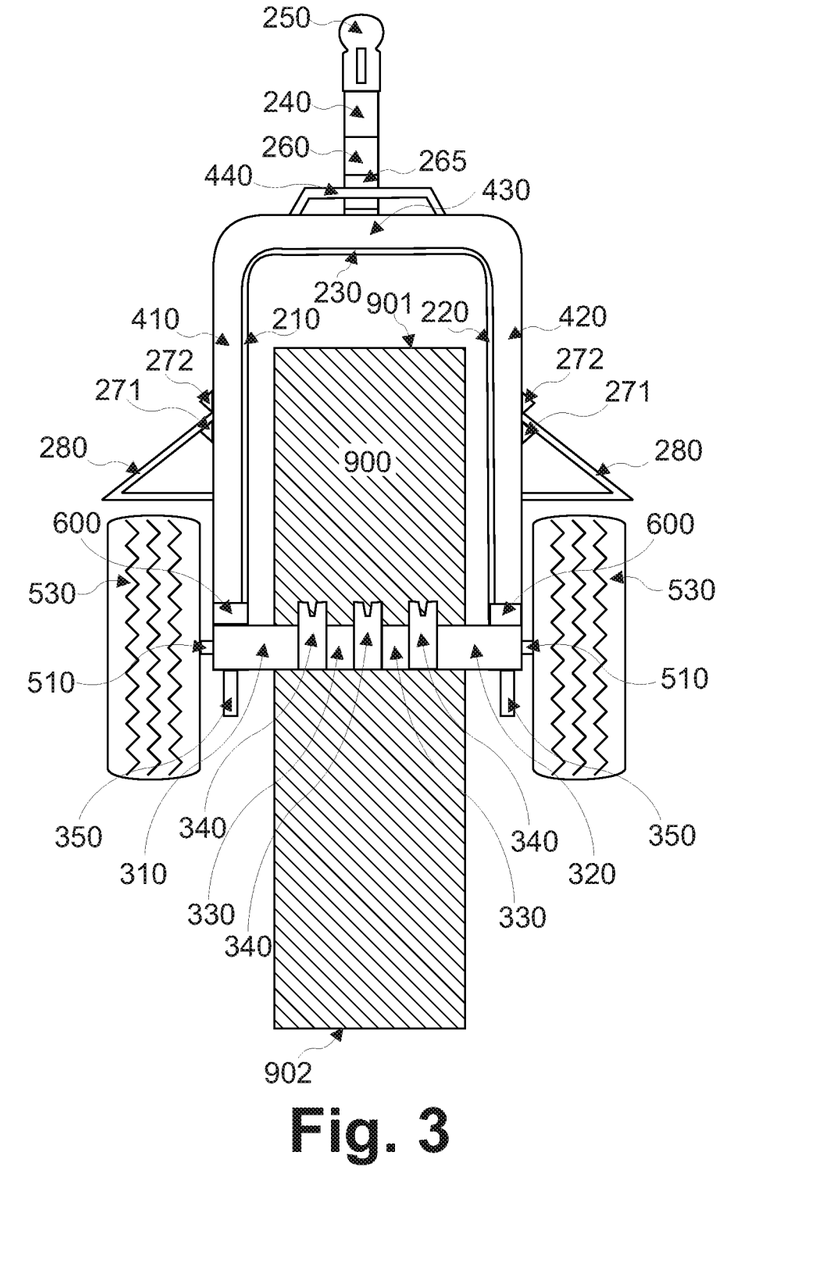
FIG. 3 is a top view of the log hauler in a down position over a log.
Figure 4:
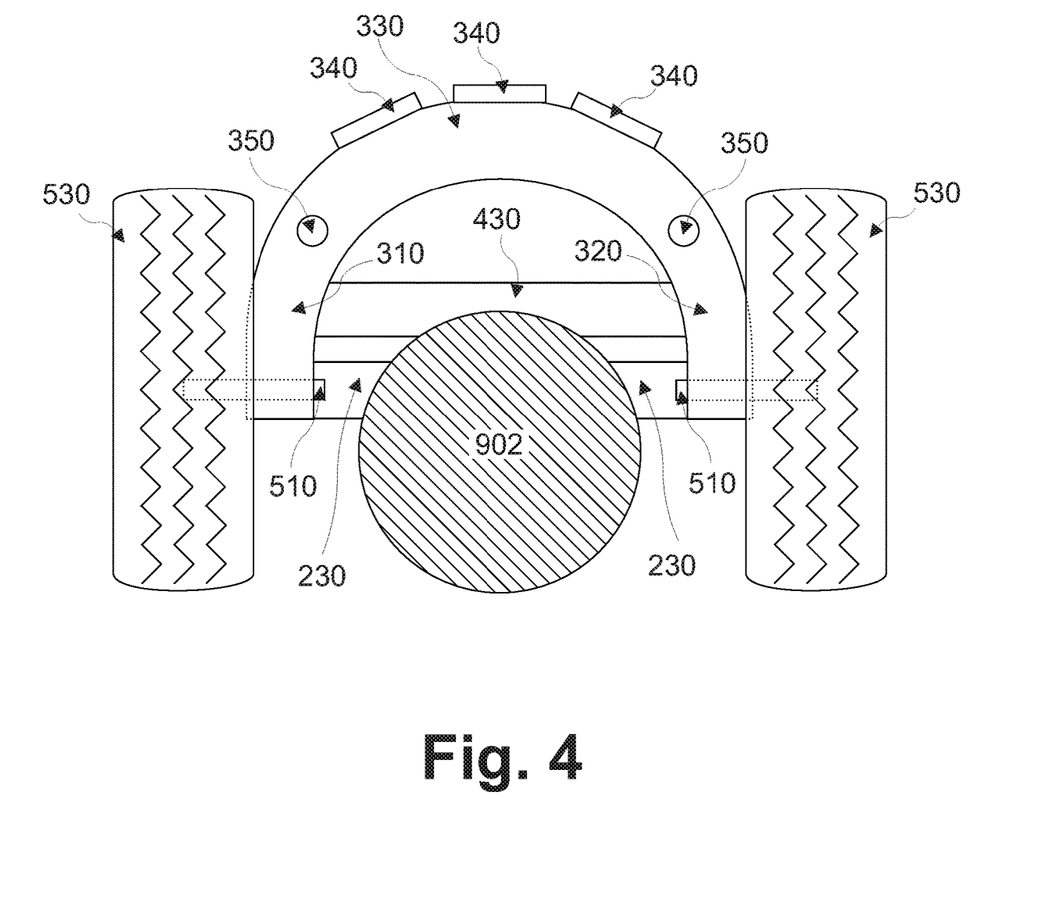
FIG. 4 is a rear view of the log hauler in a down position over a log.

To operate the log hauler, log hauler 100 is first positioned over the log 900 as shown in FIGS. 3 and 4. The log hauler 100 is positioned such that the log 900 is generally parallel to and between legs 210 and 220 of the log hauler with the end of log 901 nearest to crossbar 230 and the end of log 902 is farthest from crossbar 230. Log hauler 100 is positioned such that upright support 300 is perpendicular to and above log 900 in a position preferably from about 1 foot from the end of log 901 to about 5 feet from the end 901 of log 900, more preferably from about 2 feet from end 901 to about 4 feet from end 901. During positioning, arm 400 of log hauler 100 is in the "down" position such that the plane of arm 400 and the plane of lower body 200 of log hauler 100 are substantially parallel. The log hauler 100 can easily be positioned over the log 900 by attaching log hauler 100 to an ATV or other vehicle via trailer hitch 250 and backing log hauler 100 over the log 900. Alternatively, or in addition, log hauler 100 may be positioned over the log 900 by manually moving it using optional handle(s) 350.

A first flexible linkage 700 is passed under the log 900 such that first flexible linkage 700 is directly underneath upright support 300 and is substantially parallel to crossbar 330 of upright support 300. One especially preferred first flexible linkage 700 is a chain, although other flexible linkages could be used, such as a rope or wire cable. In one especially preferred embodiment shown in FIG. 12, first flexible linkage 700 has a lengthened and curved end 704 that enables it to more easily pass under the log. In this especially preferred embodiment, first flexible linkage 700 has a ring 705 on the end opposite lengthened and curved end 704. First flexible linkage 700 may be passed under the log either prior to positioning log hauler 100 or after positioning log hauler 100 over the log 900. For the embodiment described above, first flexible linkage 700 is preferably from about 5 feet long to about 9 feet long, more preferably about 7 feet long.

Prior to use, log hauler 100 must be attached to a towing vehicle by trailer hitch 250 so that the front end of log hauler 100 will be of sufficient weight to balance the load to be lifted and/or towed. This may be performed before or after the log hauler 100 is in position over log 900.

Figure 5:
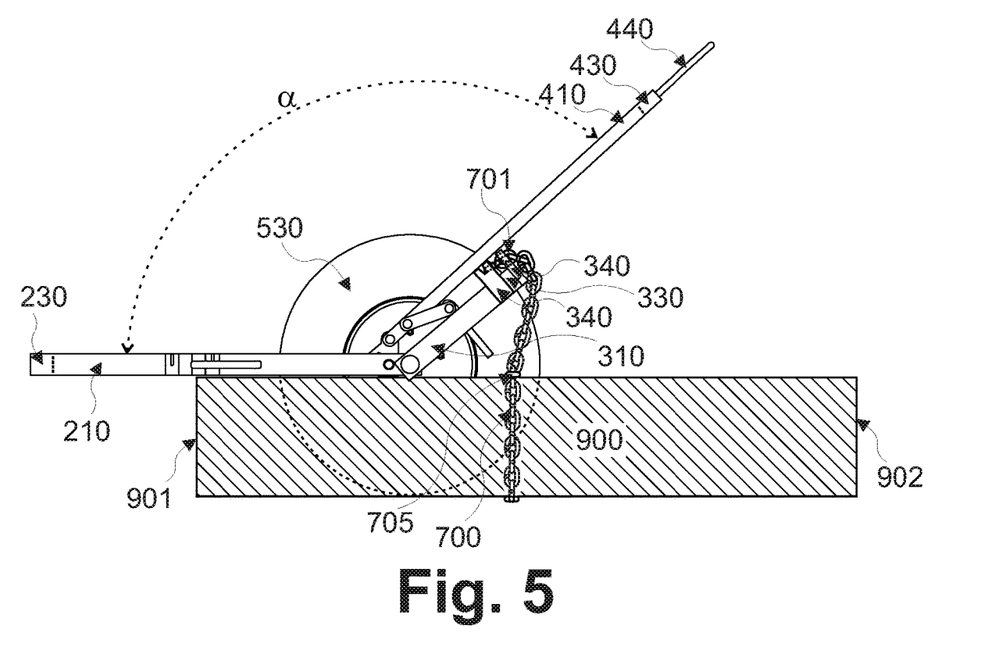
FIG. 5 is a side view of the log hauler in the up position with the log in position on the ground and the first flexible linkage in the first position. The front wheel assembly, tongue and trailer hitch are not shown.
Figure 11:
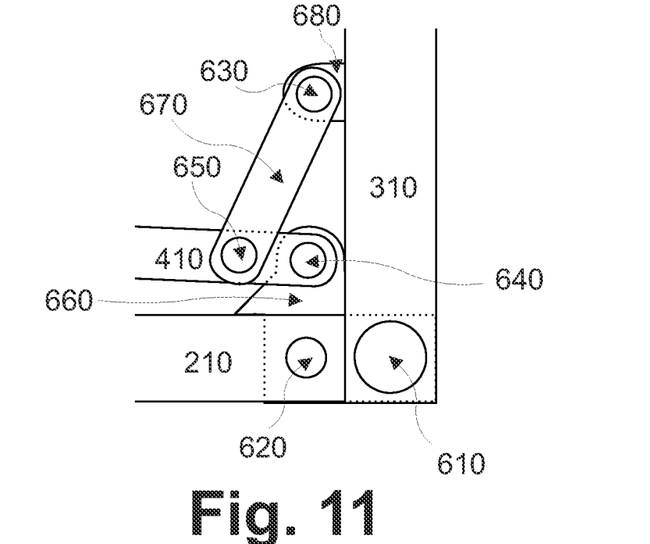
FIG. 11 is a preferred configuration for the primary movable attachment point.

As shown in FIG. 5, arm 400 of log hauler 100 is then moved to the "up" position such that the angle α formed by plane of arm 400 and the plane of lower body 200 of log hauler 100 is greater than 90 degrees, more preferably greater than 100 degrees. This positions upright support 300 such that crossbar 330 is closer to the ground than when arm 400 is in the "down" position. One end or both ends of first flexible linkage 700 is then attached to attachment point(s) 340 such that any length of first flexible linkage between attachment point 340 and the log 900 is taut and the log 900 is suspended by the first flexible linkage 700 from attachment point(s) 340. In a preferred embodiment, first flexible linkage is a chain as shown in FIG. 11, and this may be achieved by passing a lengthened and curved end 704 of the first flexible linkage 700 through a ring 705 on the opposite end such that the first flexible linkage forms a "noose" around the log 900 and only the end 704 of the first flexible linkage needs to be attached to the attachment point(s) 340. Alternatively, both ends of the first flexible linkage 700 may be attached to two separate attachment points 340 in order to suspend the log 900 from upright support 300. Advantageously, when chain is used as the flexible linkage 700, attachment point 340 may simply be a notch that is large enough for a link of the chain to go through and be held via tension. In FIG. 5, log 900 is suspended by first flexible linkage 700 by chain link 701 (the "first position").

Figure 6:
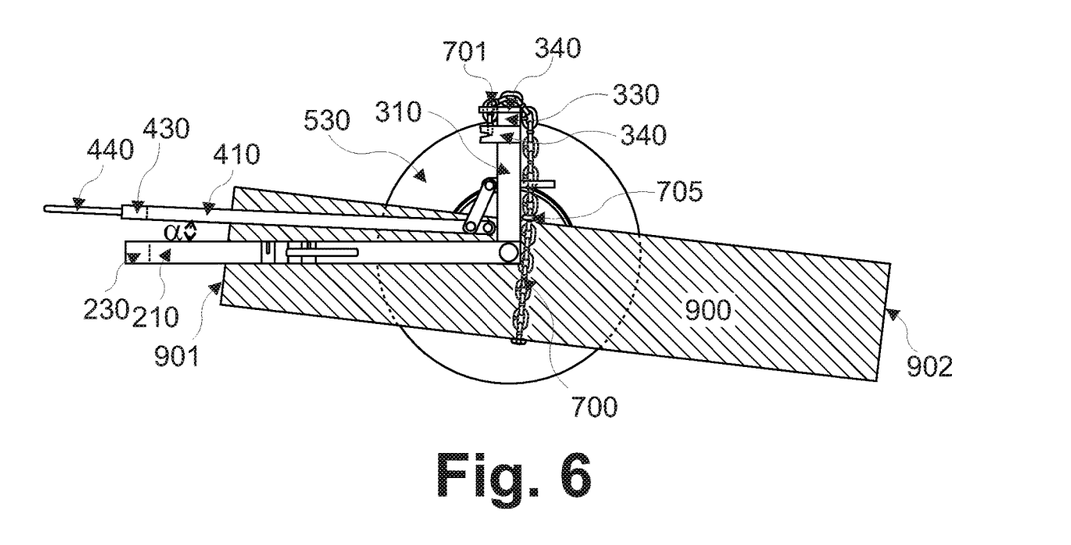
FIG. 6 is a side view of the log hauler in the down position with the log in the skid position and the first flexible linkage in the first position. The front wheel assembly, tongue and trailer hitch are not shown.

As shown in FIG. 6, once the first flexible linkage 700 is secured to attachment point(s) 340, arm 400 of log hauler 100 is moved into the "down" position such that the angle formed by the plane of arm 400 and the plane of lower body 200 of log hauler 100 is substantially parallel, that is, it is preferably less than 10 degrees, more preferably less than about 5 degrees. When the arm 400 is placed in the "down" position, crossbar 330 of upright support 300, and consequently attachment point 340, is further from the ground than when arm 400 was in the "up" position. Because of the lever formed by arm 400, it can be moved into the "down" position, thereby lifting at least a portion of log 900, by a single person.

Figure 7:
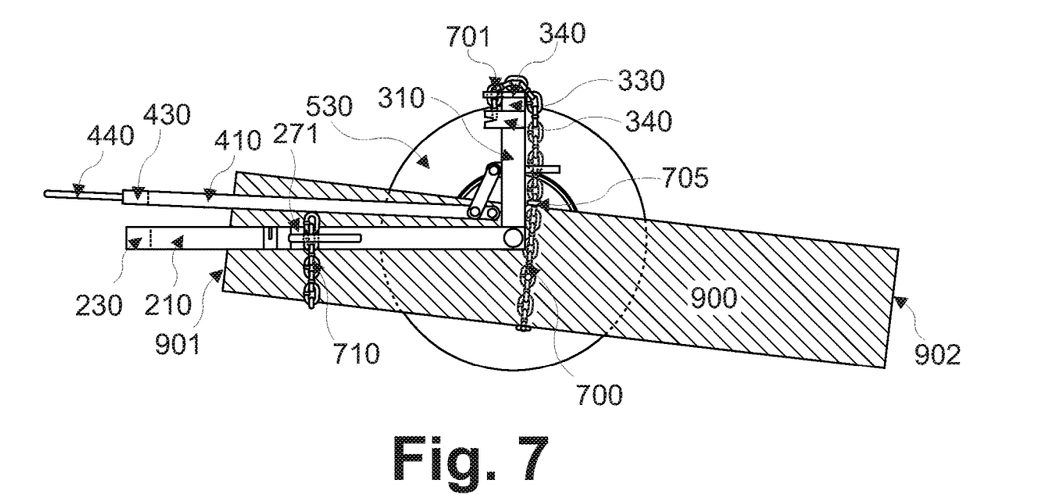
FIG. 7 is a side view of the log hauler in the down position with the log in the skid position and the second flexible linkage in place and the first flexible linkage in the first position. The front wheel assembly, tongue and trailer hitch are not shown.
Figure 13:
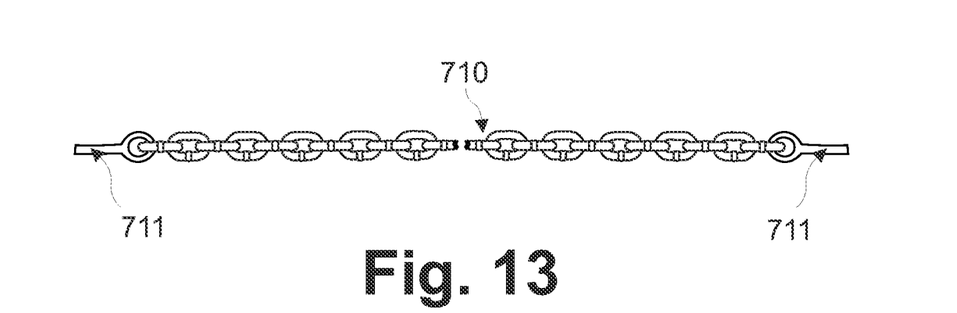
FIG. 13 is a preferred chain configuration for the second and/or third flexible linkage.
Figure 14:
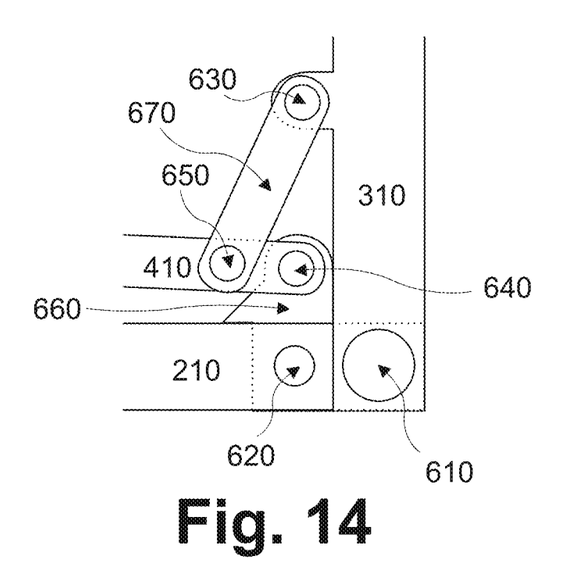
FIG. 14 is a preferred configuration for the primary movable attachment point in which the four-bar linkage is attached directly to the upright arm.

As shown in FIG. 7, after arm 400 is moved into the "down" position, a second flexible linkage 710 is passed under the log 900 and attached to attachment points 271 on each of legs 210 and 220 of the lower body. Again, when a chain is used as the second flexible linkage 710, attachment points 271 may simply be a notch that allows a single link of the chain to be held in place by tension. A preferred embodiment of the second flexible linkage 710 is shown in FIG. 13, comprising a chain in which each end of the flexible linkage 710 has a lengthened end 711 that allows it to easily pass through attachment points 271. In one preferred embodiment, the second flexible linkage is from about 4 feet long to about 6 feet long, more preferably about 5 feet long.

In one embodiment, the log 900 can be transported as-is in the "skid" position. That is, end 902 of log 900 may drag on the ground during transport. In this embodiment, arm 400 may be secured in the down position by securing arm 400 in optional locking mechanism 265 so that it is secured during transport of the log 900. In one preferred embodiment, handle 440 of arm 400 is inserted into optional locking mechanism 265 and is secured into place using a bolt, pin, lock, or combination thereof. Once secured, the log 900 can be hauled in log hauler 100 behind any suitable vehicle in the configuration shown in FIG. 7.

Figure 8:
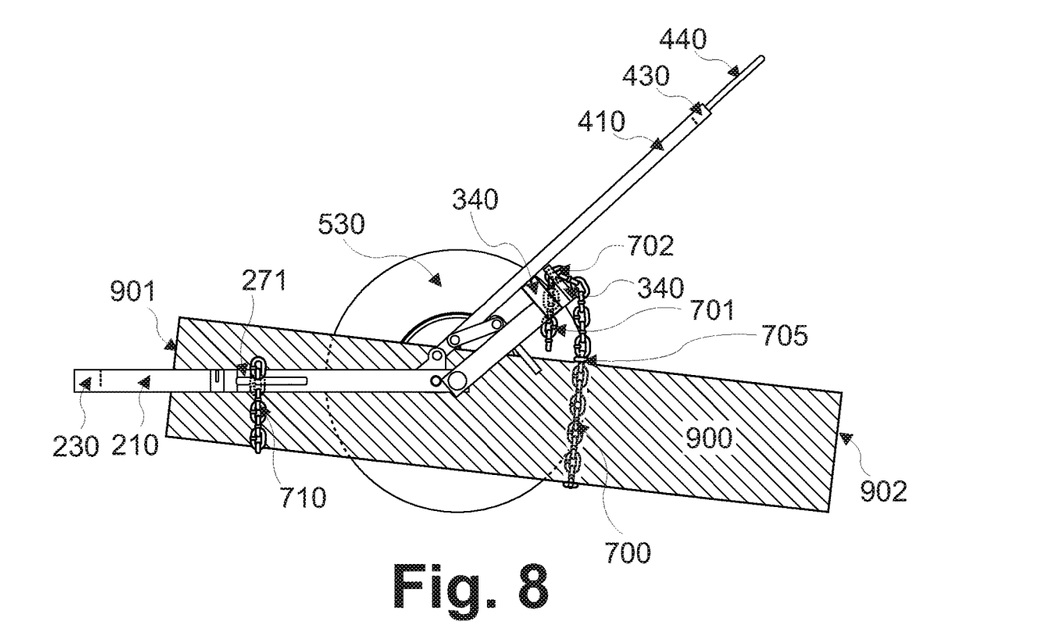
FIG. 8 is a side view of the log hauler in the up position with the log in the skid position and the second flexible linkage in place and the first flexible linkage in the second position. The front wheel assembly, tongue and trailer hitch are not shown.

In another preferred embodiment, arm 400 is again raised into the "up" position. Because front end 901 of log 900 is now held in a raised position by second flexible linkage 710, first flexible linkage 700 will no longer be taut as held by attachment point 340. It is then possible to tighten first flexible linkage 700 such that log 900 is held in a higher position by first flexible linkage 700. As shown in FIG. 8, when a chain is used as first flexible linkage 700, this can be achieved by attaching first flexible linkage 700 at link 702 (further from end 704) rather than 701 (the "second position").

Figure 9:
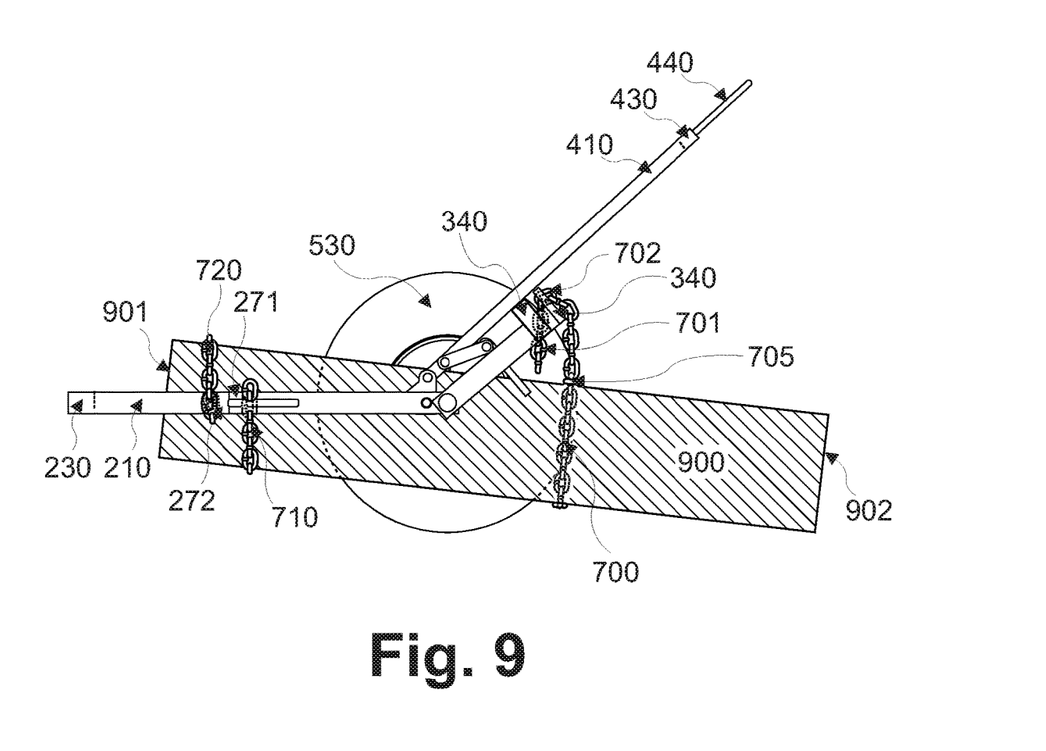
FIG. 9 is a side view of the log hauler in the up position with the log in the skid position and the second flexible linkage in place, the third flexible linkage in place, and the first flexible linkage in the second position. The front wheel assembly, tongue and trailer hitch are not shown.

As shown in FIG. 9, with arm 400 still in the "up" position, a third flexible linkage 720 is passed over the log 900 and attached to attachment points 272 on each of legs 210 and 220. Again, when a chain is used as the third flexible linkage 720, attachment points 272 may simply be a notch that allows a single link of the chain to be held in place by tension. Third flexible linkage 720 is preferably of the same size and configuration as second flexible linkage 710.

Figure 10:
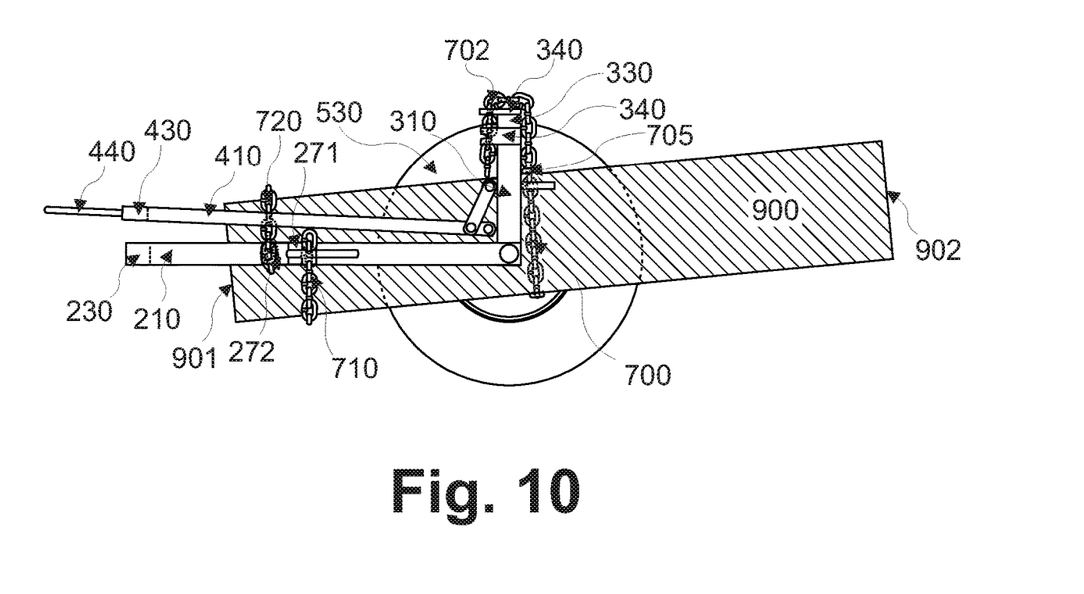
FIG. 10 is a side view of the log hauler in the down position with the log in the haul position and the second flexible linkage in place, the third flexible linkage in place, and the first flexible linkage in the second position. The front tire, tongue and trailer hitch are not shown.

Then, arm 400 is lowered back into the "down" position, thereby lifting end 902 of log 900 off the ground, as illustrated in FIG. 10. Log 900 can then be transported in the "haul" position. Before transport, arm 400 may be secured in the down position by securing arm 400 in optional locking mechanism 265 so that it is secured during transport of the log 900. In one preferred embodiment, handle 440 of arm 400 is inserted into optional locking mechanism 265 and is secured into place using a bolt, pin, lock, or combination thereof. Once secured, the log 900 can be hauled in log hauler 100 behind any suitable vehicle in the configuration shown in FIG. 10. Advantageously, in the embodiment that allows the log 900 to be transported in the "haul" position, log 900 is secured in a position off the ground, unlike other prior art log skidders, and log 900 can be transported without damage to log 900 or the ground over which the log is hauled.

The log 900 may then be easily towed behind the towing vehicle. Advantageously, due to the size of the log hauler 100, the log may be towed almost anywhere that the towing vehicle is able to drive. When the log is secured in the "haul" position and is the embodiment designed to be hauled by an ATV, a log of maximum size (24 inches in diameter) can be hauled such that it is at least 3 inches off the ground, preferably at least 5 inches off the ground. Optional wheel guards 280 also allow easier navigation of rough terrain and possible other trees or obstacles that the ATV and log hauler may encounter.

Once the log has been relocated, the log may be lowered back to the ground by performing the lifting steps in the reverse order.

I claim:

1. An apparatus for lifting an object, comprising:
a lower body comprising a first leg and a second leg; and
an upright support comprising a first leg, a second leg, and a crossbar connecting
the first leg and second leg, further comprising at least one attachment point; and
an arm,
wherein
the lower body is attached in a movable position to the upright support, and
the arm is attached in a movable position to the lower body and directly or indirectly
attached in a movable position to the upright support such that
  (i) the legs of the lower body and the legs of the upright support are substantially perpendicular when the arm is substantially parallel to the legs of the lower body and,
  (ii) the angle between legs of the lower body and the legs of the upright support is larger than the angle between the legs of the lower body and the arm when the angle between the legs of the lower body and the arm is greater than 90 degrees.

2. The apparatus of claim 1, where the lower body further comprises a crossbar connecting the first leg and second leg.

3. The apparatus of claim 1, where the arm comprises a first leg, a second leg, and a crossbar connecting the first leg and second leg.

4. The apparatus of claim 1, wherein the first leg and second leg of the lower body have one or more attachment point.

5. The apparatus of claim 1, further comprising a tongue attached to the crossbar of the lower body.

6. The apparatus of claim 5, further comprising a trailer hitch attached to the tongue.

7. The apparatus of claim 1, further comprising wheels connected to the legs of the lower body.

8. The apparatus of claim 7, wherein the attachment point between the upright support and the lower body is a pin.

9. The apparatus of claim 8, wherein said pin also forms the connection between the wheels and the legs of the lower body.

10. The apparatus of claim 1, wherein the lower body, the upright support, and the arm are connected by two four-bar linkages.

11. The apparatus of claim 1, wherein the apparatus does not comprise a winch or hydraulics.

12. A method of lifting an object comprising:
  (i) positioning the apparatus of claim 1 over the object such that the object is between the first leg and second leg of the lower body; and
  (ii) moving the arm such that the angle between the legs of the lower body and the arm is greater than 90 degrees; and
  (iii) positioning a first flexible fastener under the object and attaching the flexible fastener to an attachment point of the upright support; and
  (iv) moving the arm such that the arm is substantially parallel to the legs of the lower body and the object is suspended from an attachment point of the upright support.

13. The method of claim 12, further comprising wrapping a second flexible fastener under the object and attaching the second flexible fastener to the first and second legs of the lower body.

14. The method of claim 13, wherein the apparatus of claim 1 is attached to a vehicle and further comprising towing the apparatus of claim 1 behind the vehicle.

15. The method of claim 13, further comprising:
moving the arm such that the angle between the legs of the lower body and the arm is greater than 90 degrees; and
  (ii) detaching the first flexible fastener from the crossbar of the upright support and reattaching the first flexible fastener to the crossbar of the upright support so as to remove any slack from between the object and the upright support.

16. The method of claim 15, wherein the apparatus of claim 1 is attached to a vehicle and further comprising moving the arm such that the arm is substantially parallel to the legs of the lower body and towing the apparatus of claim 1 behind the vehicle.

17. The method of claim 15, further comprising
  (i) placing a third flexible fastener over the object and attaching it to the first leg and second leg of the lower body, and
  (ii) moving the arm such that the arm is substantially parallel to the legs of the lower body.

18. The method of claim 17, wherein the apparatus of claim 1 is attached to a vehicle and further comprising towing the apparatus of claim 1 behind the vehicle.

19. The method of claim 18, where the vehicle is an ATV.

20. The method of claim 12, wherein the object is a log.

* * * * *